US009480376B1

(12) United States Patent
Lauer

(10) Patent No.: US 9,480,376 B1
(45) Date of Patent: Nov. 1, 2016

(54) DEBRIS-COLLECTING APPARATUS

(71) Applicant: Billy Goat Industries, Inc., Lee's Summit, MO (US)

(72) Inventor: G. Kent Lauer, Lee's Summit, MO (US)

(73) Assignee: Billy Goat Industries, Inc., Lee's Summit, MO (US)

( * ) Notice: Subject to any disclaimer, the term of this patent is extended or adjusted under 35 U.S.C. 154(b) by 846 days.

(21) Appl. No.: 13/739,716

(22) Filed: Jan. 11, 2013

Related U.S. Application Data

(63) Continuation-in-part of application No. 29/423,955, filed on Jun. 6, 2012, now Pat. No. Des. 706,005, and a continuation-in-part of application No. 29/423,961, filed on Jun. 6, 2012, now Pat. No. Des. 702,902.

(60) Provisional application No. 61/624,688, filed on Apr. 16, 2012.

(51) Int. Cl.
*A47L 9/14* (2006.01)
*A47L 9/16* (2006.01)
*A01G 1/12* (2006.01)

(52) U.S. Cl.
CPC .............. *A47L 9/14* (2013.01); *A01G 1/125* (2013.01); *A47L 9/1608* (2013.01)

(58) Field of Classification Search
CPC ....... A47L 9/1683; A47L 9/14; A47L 9/149; A47L 9/1608; B01D 2239/0435; B04C 2009/001; A01G 1/125
USPC ............................................. 15/347; 551/380
See application file for complete search history.

(56) References Cited

U.S. PATENT DOCUMENTS

| 1,691,536 A | 11/1928 | Winslow et al. |
| 2,074,818 A | 3/1937 | Watson |
| 2,248,181 A | 7/1941 | Little |
| 3,246,459 A | 4/1966 | Goldberg et al. |
| 3,353,340 A | 11/1967 | Carsey |
| 4,246,013 A | 1/1981 | Truhan et al. |
| D294,031 S | 2/1988 | Hosonuma |
| 4,819,417 A * | 4/1989 | Bryant ................. A01D 43/077 56/16.6 |

(Continued)

OTHER PUBLICATIONS

U.S. Appl. No. 13/786,107 Non-Final Office Action dated Aug. 26, 2015, 25 pages.

(Continued)

*Primary Examiner* — Michael Kornakov
*Assistant Examiner* — Katelyn Whatley
(74) *Attorney, Agent, or Firm* — Lathrop & Gage LLP

(57) ABSTRACT

Debris-collecting apparatus and methods of use are provided. One hood is provided for use with a mobile debris-collecting apparatus that has an input portion, a draft inducer, and a bag. The hood has an inlet for receiving air and debris drawn through the input portion by the draft inducer, and the hood includes a helical passage extending downwardly from the inlet at least two hundred and seventy degrees about an imaginary vertical axis to direct the air and debris from the inlet to the bag in a helical direction. An opening may be formed inside the helical passage, and the hood may include a filter removably positioned to restrict the debris from exiting through the opening. The filter may extend downwardly inside the helical passage and/or the bag, whereby further causing helical movement of the debris by providing an inner boundary around which the debris must pass.

20 Claims, 9 Drawing Sheets

(56) References Cited

U.S. PATENT DOCUMENTS

| | | |
|---|---|---|
| D306,787 S | 3/1990 | Candella |
| 5,390,865 A | 2/1995 | Vandermolen et al. |
| 6,658,833 B2* | 12/2003 | Dunning ............... A01G 1/125 56/16.6 |
| 6,904,742 B2* | 6/2005 | Dunning ............... A01G 1/125 56/16.6 |
| 8,034,192 B2 | 10/2011 | Ringer et al. |
| D651,775 S | 1/2012 | Cheng |
| D693,851 S | 11/2013 | Fujiwara |
| 2005/0279061 A1 | 12/2005 | Broughton |
| 2008/0196196 A1 | 8/2008 | Conrad |
| 2009/0104033 A1 | 4/2009 | Rappin |
| 2013/0115863 A1 | 5/2013 | Mizutani et al. |

OTHER PUBLICATIONS

Notice of Allowance issued in related U.S. Appl. No. 29/423,961, received Jan. 24, 2014.

Notice of Allowance issued in related U.S. Appl. No. 29/423,955, received Feb. 3, 2014.

U.S. Appl. No. 13/786,107, Office Action dated Mar. 2, 2016, 21 pages.

* cited by examiner

DEBRIS-COLLECTING APPARATUS

RELATED APPLICATIONS

This application claims priority to provisional U.S. Patent Application No. 61/624,688, filed Apr. 16, 2012. This application is also a continuation-in-part claiming priority to U.S. patent application Ser. No. 29/423,955, filed Jun. 6, 2012, now U.S. Design Pat. D706,005. And this application is a continuation-in-part claiming priority to U.S. patent application Ser. No. 29/423,961, filed Jun. 6, 2012, now U.S. Design Pat. D702,902. The disclosure of each is incorporated herein in its entirety by reference.

BACKGROUND

The invention relates generally to the field of debris-collecting apparatus, such as leaf vacuums. Debris-collecting apparatus, such as leaf vacuums, typically have an input portion through which debris may enter, a bagging portion (typically including a bag), and a rotating member or other device for creating a current of air toward the bagging portion. When a current of air is created, the debris is moved by the current of air from the input portion to the bagging portion. Importantly, the bagging portion must allow air to pass; otherwise, the current of air will stop moving to the bagging portion with sufficient force to transport the debris from the input portion to the bagging portion. This raises contradictory priorities that must be addressed in the design of the apparatus, as a porous bag is often needed for airflow considerations, but may also allow debris to pass through (thus impeding the entire point of using the apparatus).

Moreover, even when a debris-collecting apparatus is designed such that the bagging portion is sufficiently porous yet still—at least initially—collects an acceptable amount of debris, the debris often obstructs (or "clogs") the bag pores. As a result, to maintain the necessary airflow to draw a desired amount of debris through the input portion, the bag must be emptied or exchanged well before the bag is full in traditional debris-collecting apparatus.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

In one embodiment, a debris-collecting apparatus includes an input portion, a bagging portion, and a draft inducer for drawing the air and debris through the input portion and to the bagging portion. The bagging portion has a hood, a bag removably positioned lowerly adjacent the hood, and a bagging passage for directing air and debris to the hood from the input portion. The hood has a helical configuration extending from the bagging passage toward the bag. A frame is operatively coupled to the input portion, the bagging portion, and the draft inducer. The frame has at least one wheel to facilitate transportation.

In another embodiment, a hood is disclosed for use with a mobile debris-collecting apparatus that has an input portion, a draft inducer, and a bag. The hood has an inlet for receiving air and debris drawn through the input portion by the draft inducer, and the hood includes a helical passage extending downwardly from the inlet at least two hundred and seventy degrees about an imaginary vertical axis to direct the air and debris from the inlet to the bag in a helical direction.

In still another embodiment, a method of filling a bag in a mobile debris-collecting apparatus includes the steps: (a) drawing air and debris through an input portion; and (b) directing the air and debris toward the bag downwardly in a helical direction along a helical passage extending at least two hundred and seventy degrees about an imaginary vertical axis.

DETAILED DESCRIPTION

Figure 1:
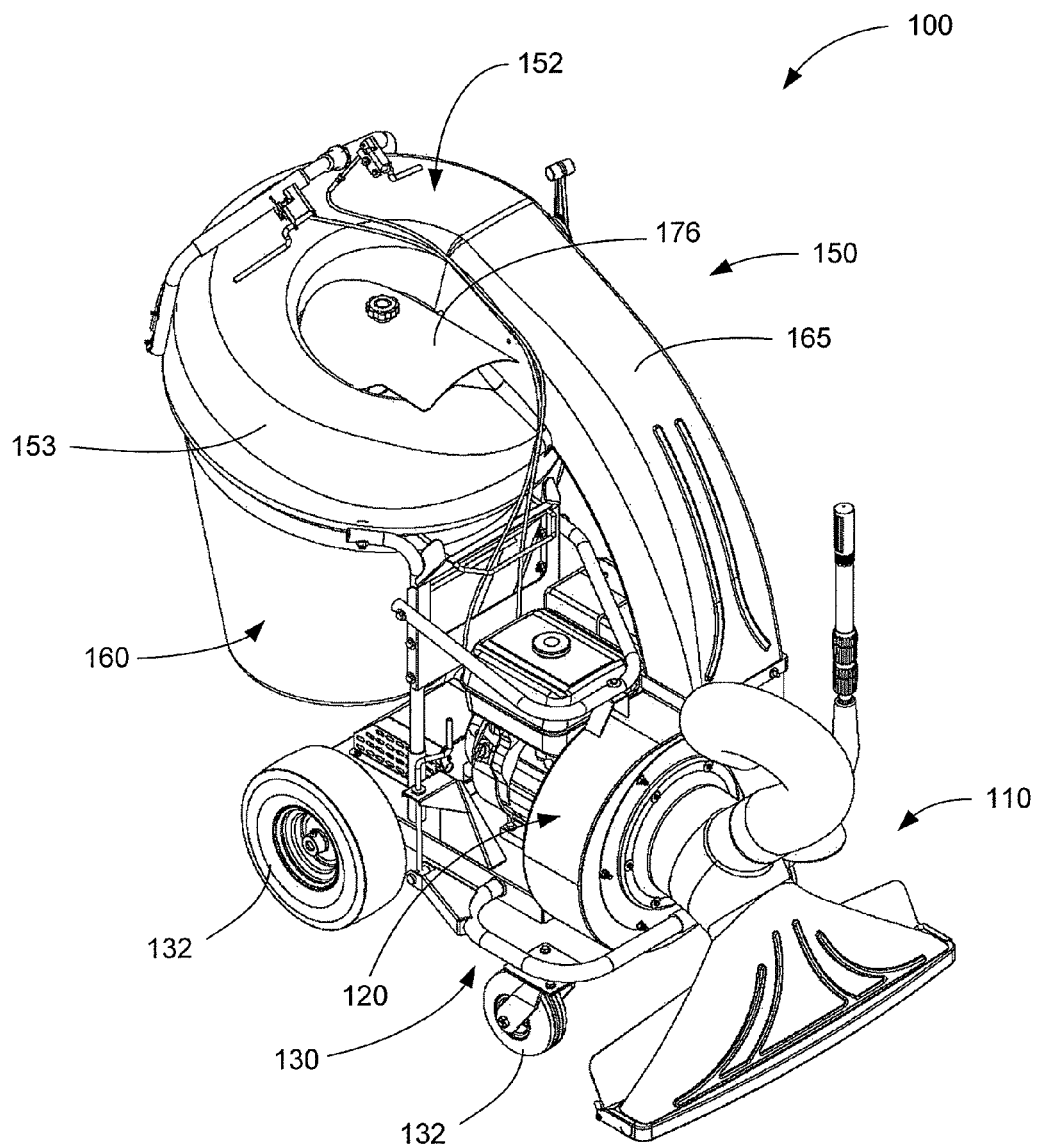
FIG. 1 is a perspective view of a debris-collecting apparatus according to one embodiment of the current invention.
Figure 2:
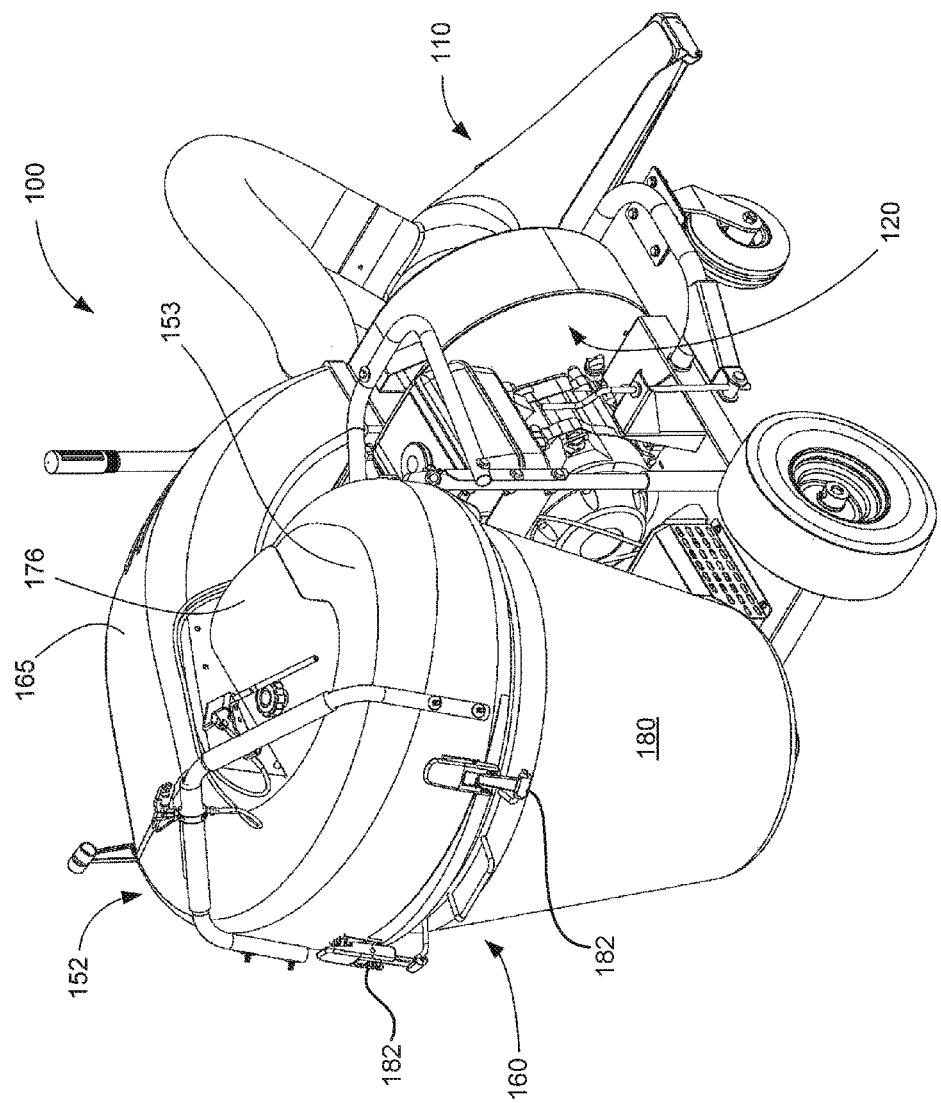
FIG. 2 is another perspective view of the debris-collecting apparatus of FIG. 1.
Figure 3:
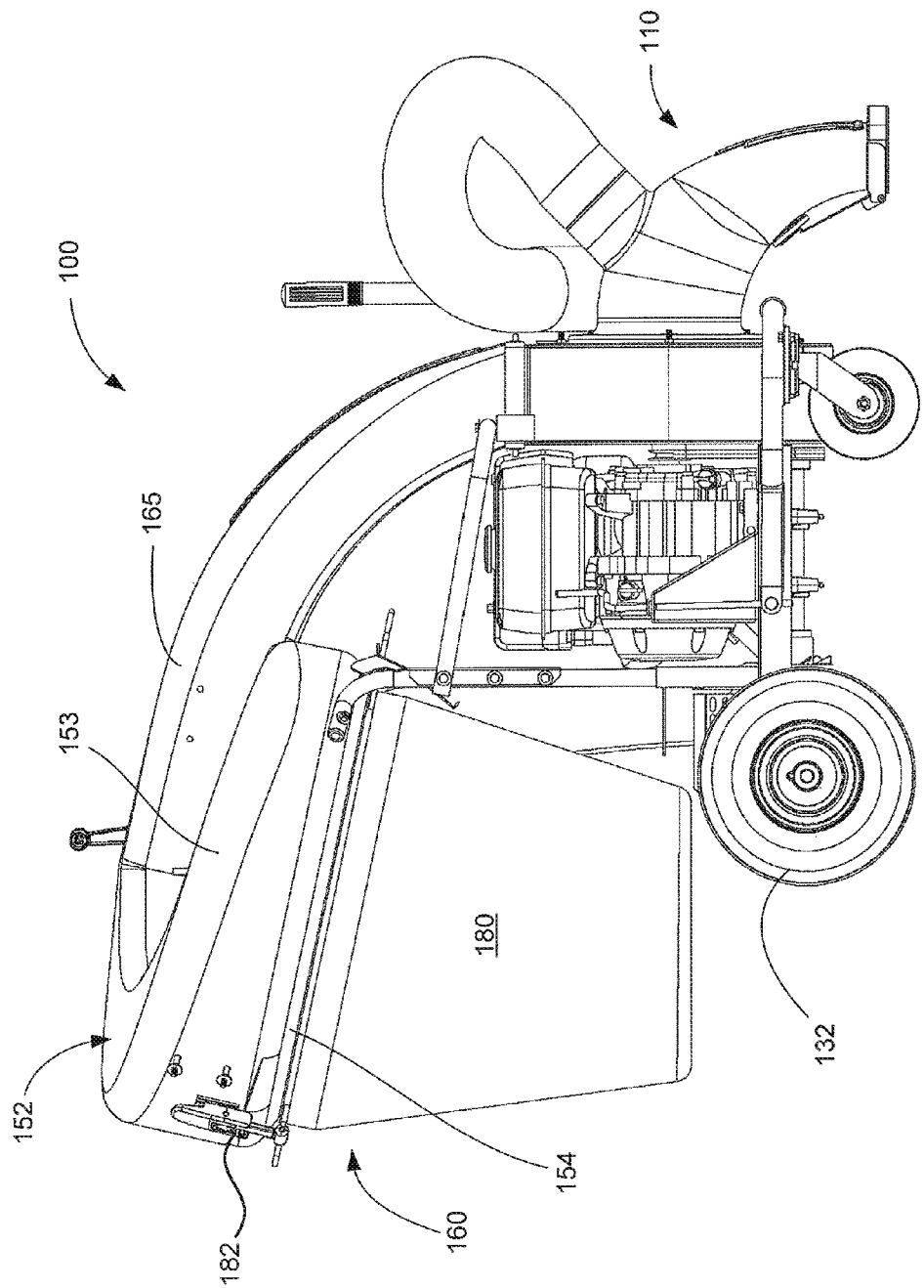
FIG. 3 is a side view of the debris-collecting apparatus of FIG. 1.
Figure 4:
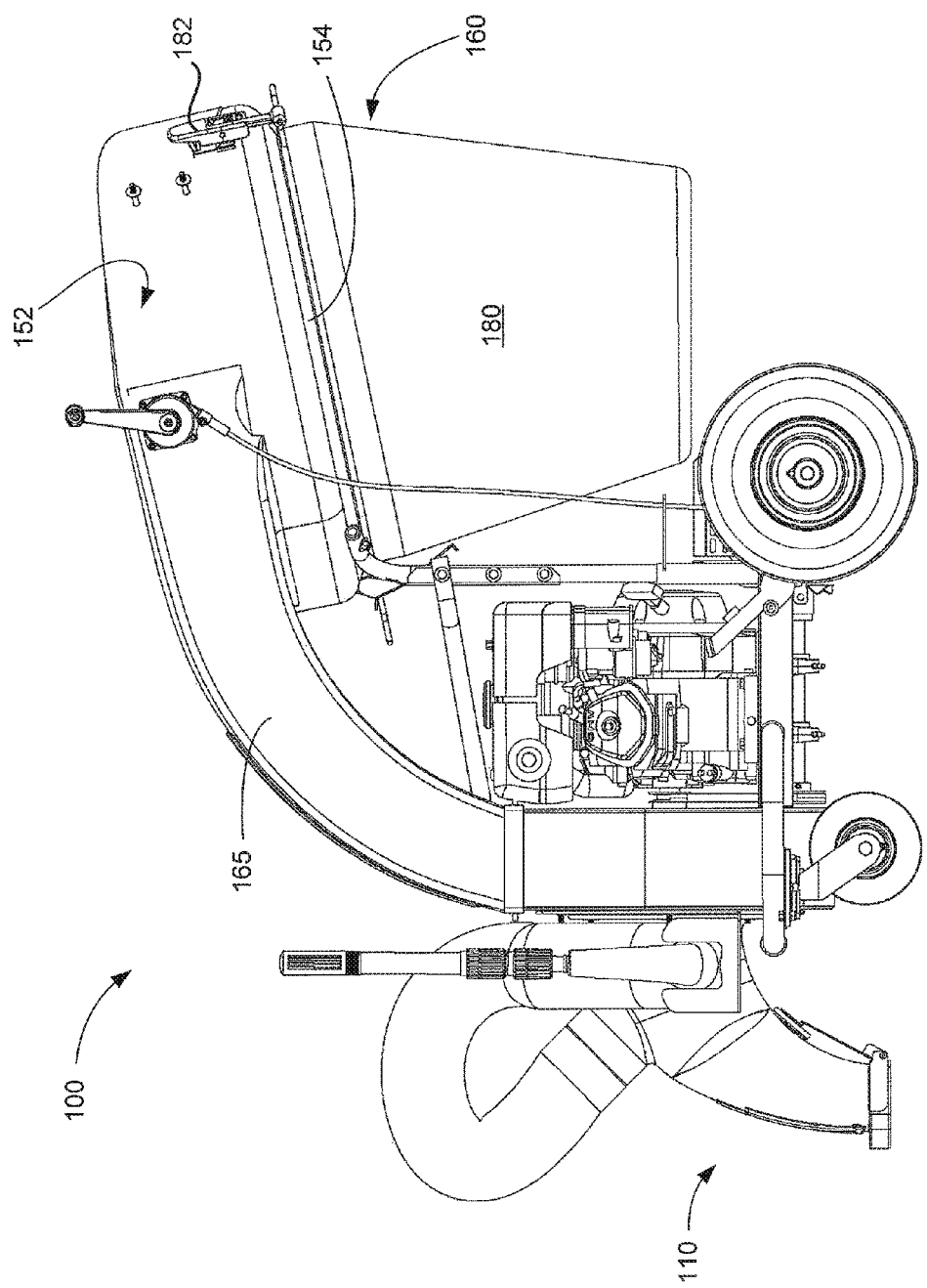
FIG. 4 is an opposite side view of the debris-collecting apparatus of FIG. 1.
Figure 5:
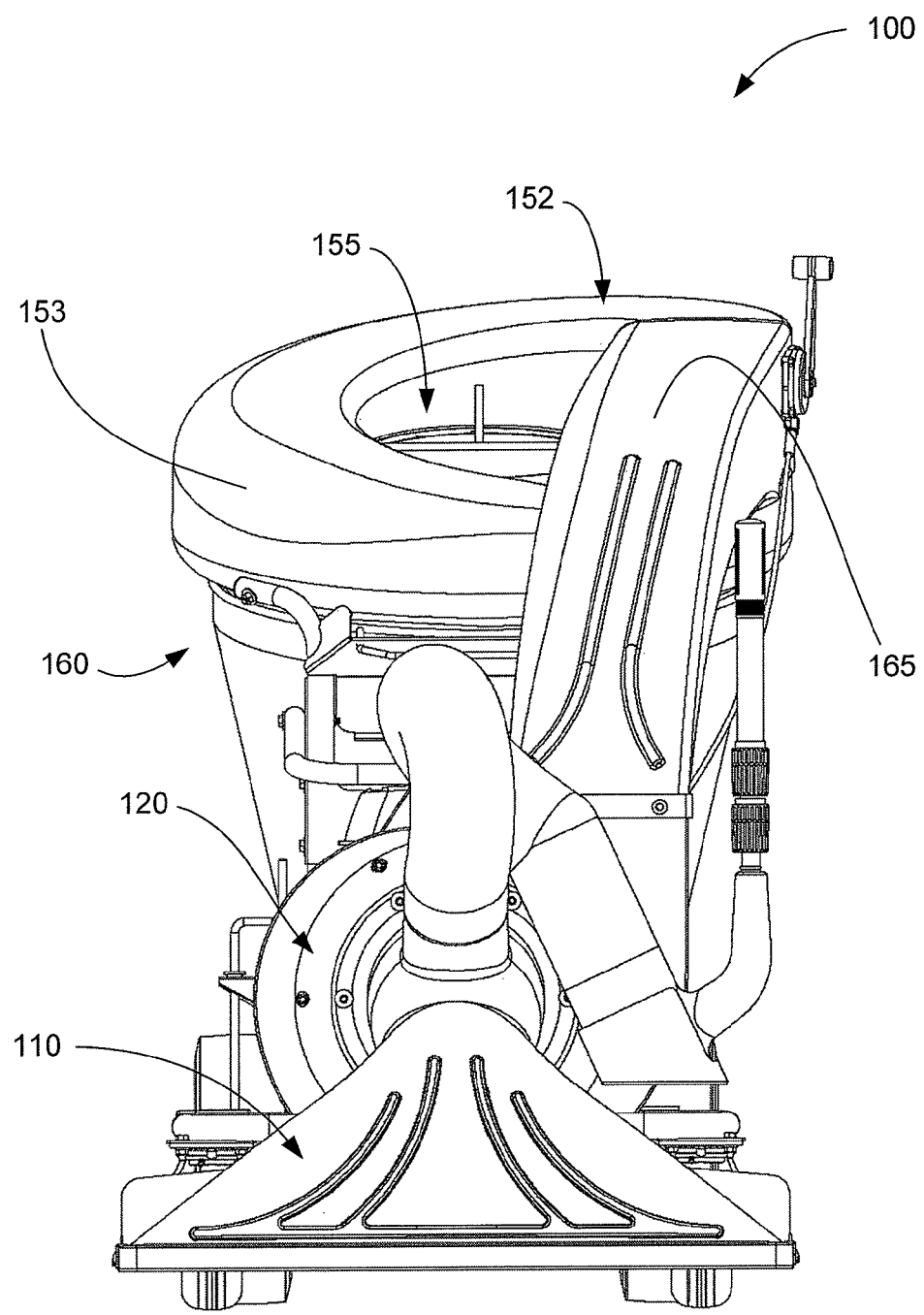
FIG. 5 is a front view of the debris-collecting apparatus of FIG. 1.

Embodiments of the current invention provide debris-collecting apparatus that may effectively capture debris while utilizing substantially all of the available bag capacity.

As shown in FIGS. 1 through 8, a debris-collecting apparatus 100 according to one embodiment includes an input portion 110, a bagging portion 150, a draft inducer 120 for drawing debris through the input portion 110 and to the bagging portion 150, and a frame 130 with wheels 132 allowing the apparatus 100 to be easily transported. The input portion 110, the draft inducer 120, and the frame 130 are shown to be typical elements in debris-collecting apparatus. However, those skilled in the art will appreciate that alternate configurations (whether now existing or later developed) may be used.

Figure 8:
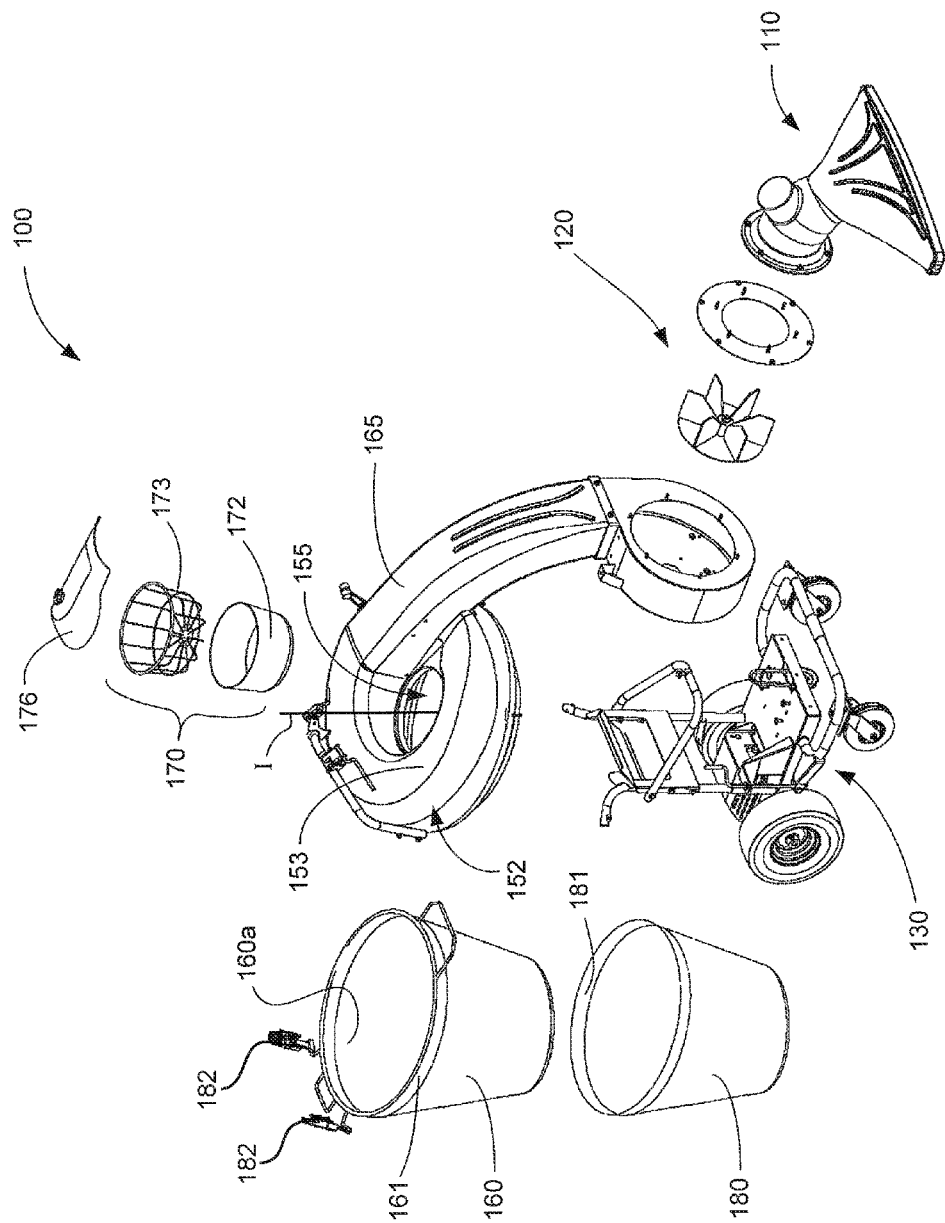
FIG. 8 is an exploded view of the debris-collecting apparatus of FIG. 1.

Focus is now directed to the bagging portion 150, which includes a hood 152, a bag 160, and a bagging passage 165 directing debris to the hood 152 from the input portion 110. The hood 152 includes a helical configuration 153 extending from the bagging passage 165 toward the bag 160, which is removably located lowerly adjacent the hood 152. It may be desirable for the helical configuration 153 of the hood 152 to extend such that it directs air and debris from the bagging passage 165 to a point below where the air and debris enter the hood 152 from the bagging passage 165 (as shown in FIGS. 1, 3, 5, and 8), causing the air and debris to travel in a downward spiral to the bag 160. It may further be desirable for the helical configuration 153 to extend at least two hundred and seventy degrees about an imaginary vertical axis I, and it may be even more desirable for the helical configuration 153 to extend at least three hundred and sixty degrees about the imaginary vertical axis I as shown in FIG. 8.

While the pitch of the helical configuration 153 may vary, depending on for example the diameter of the helical configuration 153, it may be desirable for the pitch to be between about five and eight inches of drop per revolution.

Figure 6:
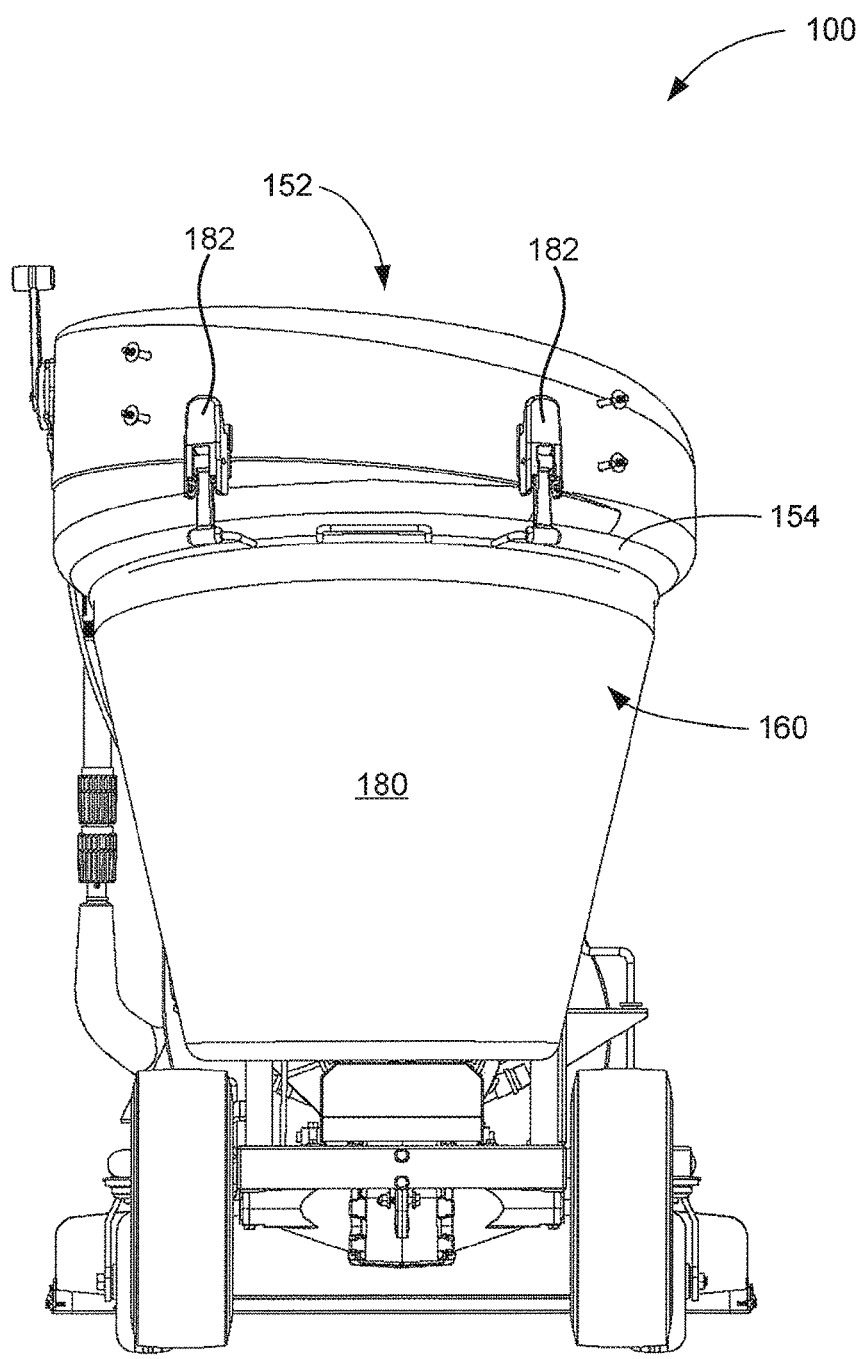
FIG. 6 is a rear view of the debris-collecting apparatus of FIG. 1.
Figure 7:
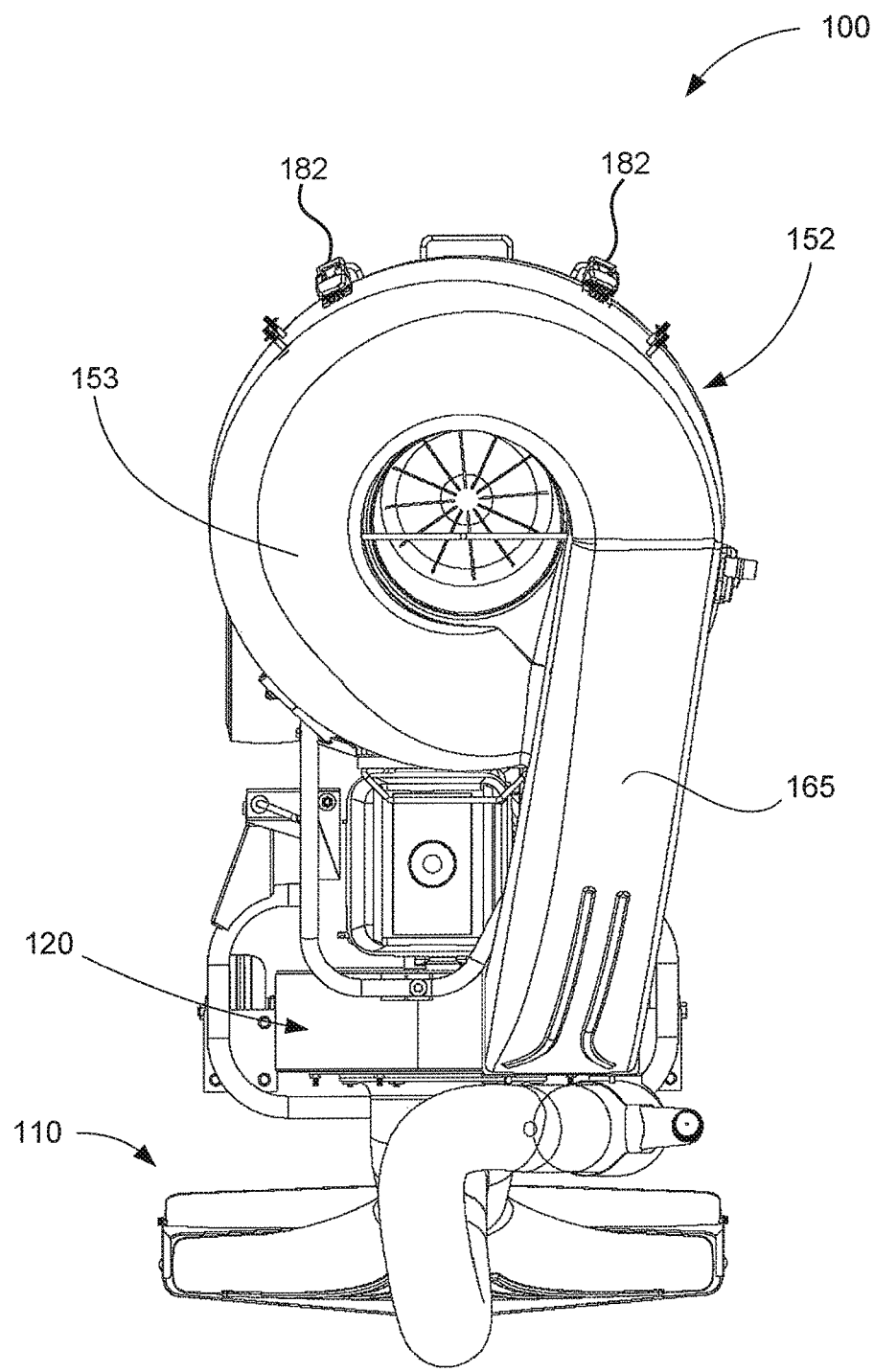
FIG. 7 is a top view of the debris-collecting apparatus of FIG. 1, with a deflecting member removed for illustration.

As best shown in FIG. 6, a ramp 154 may be located at a lower end of the helical configuration 153 to direct air and debris away from the hood 152. This may enhance the helical travel of air and debris into the bag 160. The ramp 154 may function as desired by extending from about ten degrees to forty-five degrees, and it may be particularly desirable for the ramp 154 to extend at approximately twenty-seven degrees as shown. Diameter, depth, and pitch of the helical configuration may affect the optimal angle of the ramp 154.

The ramp 154 may act as a bridge between the helical configuration 153 and the bag 160, with the bag 160 having a smaller diameter than the helical configuration 153, as shown in the drawings. Alternately, the ramp 154 may be internal structure, allowing the helical configuration 153 and the bag 160 to have generally the same diameter. And while the drawings show the ramp 154 as being integral with the hood 152, in some embodiments the ramp 154 may be integral with the bag 160 or distinct from both the hood 152 and the bag 160. Although the ramp 154 may generally extend fully about the lower end of the helical configuration 153 (i.e., 360 degrees), it may be possible—and especially when the ramp 154 is internal structure—for the ramp 154 to extend less than 360 degrees.

Figure 9A:
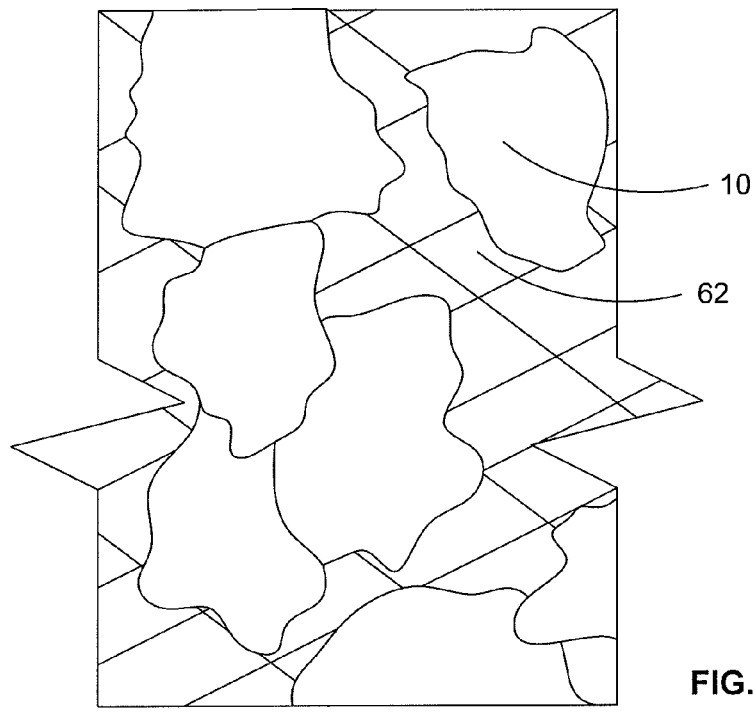
FIG. 9a illustrates debris build-up along bag pores in prior art systems.
Figure 9B:
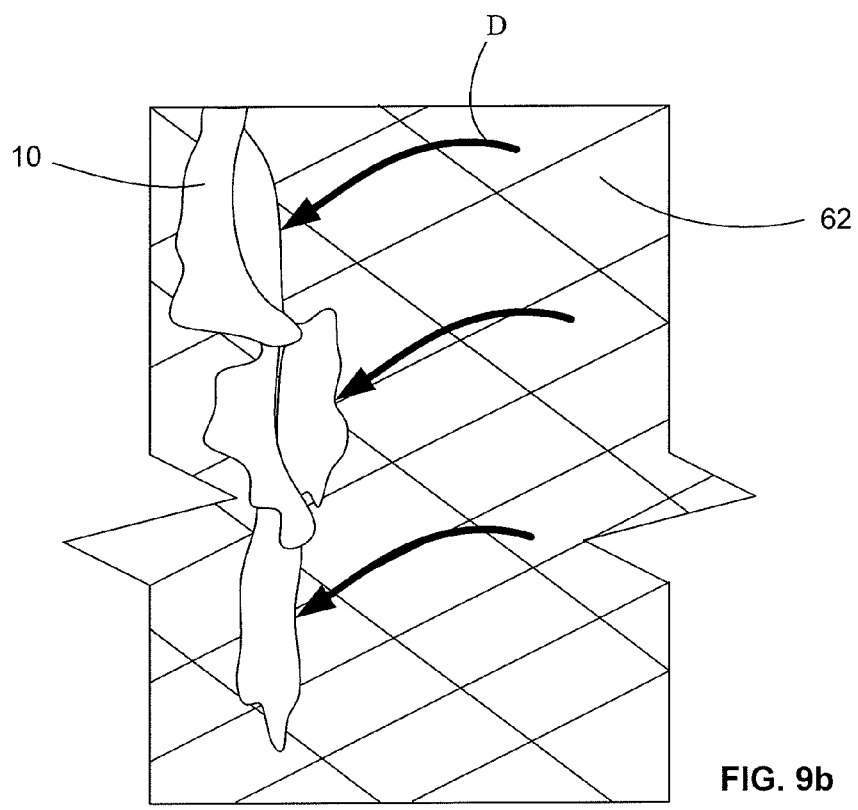
FIG. 9b illustrates debris being dislodged from bag pores during use of the embodiment of FIG. 1.

Contrary to airflow in prior art systems, where debris is allowed to collect along the bag and obstruct air from exiting, the airflow caused by the helical configuration 153 (either alone, or especially in tandem with the ramp 154) may cause a self-cleaning effect where debris entering the bag 160 dislodges at least a portion of debris collected at an inner face 160a (FIG. 8) of the bag 160. This dislodging is illustrated in FIGS. 9a and 9b (which are not to scale) and may aid in allowing debris to collect away from the inner face 160a of the bag 160 and increase the amount of the bag capacity that may be effectively used. Pores 62 in an air permeable bag 60 are shown covered by debris 10 in FIG. 9a, in accordance with prior art systems. FIG. 9b represents an effect of airflow in helical direction D according to one embodiment of the current invention, and shows the debris 10 being dislodged to clear pores 162 in the bag 160.

As shown in FIG. 8, an opening 155 may be formed in the hood 152 inside the helical configuration 153, and a filter 170 may be removably positioned to prevent debris from exiting through the opening 155. The opening 155 and filter 170 may allow a low-pressure area to form away from the inner face 160a of the bag 160, further drawing debris away from the inner face 160a, and may provide an additional air outlet to maintain airflow through the input portion 110. In some embodiments, the filter 170 may extend downwardly inside the hood 152 and/or the bag 160 to provide an inner boundary around which debris must pass to further define helical movement of air and debris. And the helical movement of air and debris may cause a self-cleaning effect where debris collected on the filter 170 is dislodged, similar to the self-cleaning effect discussed above. This dislodging may aid in allowing debris to collect throughout the bag 160 and increase the amount of the bag capacity that may be effectively used.

A deflecting member 176 may cover the opening 155, as shown in FIG. 1, to direct the air exiting the hood 152 through the opening 155. The deflecting member 176 may be coupled to the filter 170, the hood 152, or any other appropriate structure, and in some embodiments the deflecting member 176 is adjustable such that the direction of airflow out of the opening 155 (e.g., angle and direction of travel) may be selected. In some embodiments that do not incorporate the filter 170 and the deflecting member 176, structure may nevertheless extend inside the hood 152 to provide an inner boundary around which debris must pass to further define helical movement of air and debris.

The hood 152 may be constructed of plastics, metals, and/or other appropriate materials. Moreover, while the helical configuration 153 is visible in the embodiment 100, those skilled in the art will appreciate that other external configurations may be utilized while maintaining the helical configuration 153 internally (e.g., through baffling), and that the external helical configuration may be desirable for its aesthetic properties.

The bag 160 may be constructed of polyester non-woven felt, woven nylon, or any other desirable material, and a secondary bag (or "dust skirt") 180 (FIG. 8) may be removably positioned around the bag 160. While the dust skirt 180 may also be constructed of any desirable material, it may be particularly desirable for a charged material to be used. One example of such charged material is sold under the trademark Technostat™ by Hollingsworth & Vose of East Walpole, Mass.

The dust skirt 180 may be placed outside the bag 160 in various ways. For example, hook and loop fasteners may join the dust skirt 180 to the bag 160. FIG. 8 shows hook fasteners 161 on the bag 160 and loop fasteners 181 on the dust skirt 180. Placing the hook fasteners 161 on the bag 160 instead of the dust skirt 180 may prevent undesired interaction between the hook fasteners 161 and the bag 160 when the dust skirt 180 is pulled over the bag 160. Those skilled in the art will appreciate that various structure may be used to removably couple the dust skirt 180 to the bag 160, and also that latches/clamps 182 or other various structure may be used to temporarily (i.e., removably) secure the bag 160 beneath the hood 152. Particularly in securing the bag 160 beneath the hood 152, various seals—and even overlapping layers of the material used to construct the bag 160 may be utilized to prevent debris from escaping through openings between the bag 160 and the hood 152.

Returning now to the filter 170, the filter 170 may also include various materials and a secondary "dust skirt". More particularly, as shown in FIG. 8, the filter 170 may include a sleeve 172 of polyester non-woven felt, woven nylon, or any other desirable material, outside a frame 173, and a dust skirt may additionally be coupled to the frame 173 to catch debris passing through the sleeve 172. Similar to the dust skirt 180, while the dust skirt outside the sleeve 172 may be constructed of any desirable material, it may be particularly desirable for a charged material to be used.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the present invention.

The invention claimed is:

1. A debris-collecting apparatus, comprising:
   an input portion;
   a bagging portion having a hood, an air permeable bag removably positioned lowerly adjacent the hood, and a bagging passage for directing air and debris to the hood from the input portion; the hood having a helical configuration extending from the bagging passage toward the air permeable bag;
   a draft inducer for drawing the air and debris through the input portion and to the bagging portion;
   a frame operatively coupled to the input portion, the bagging portion, and the draft inducer; the frame having at least one wheel to facilitate transportation; and
   a ramp for directing the air and debris away from the hood and into the air permeable bag; the air permeable bag having a smaller diameter than the helical configuration; the ramp bridging the helical configuration and the air permeable bag;
   wherein the helical configuration of the hood extends such that the air and debris from the bagging passage travel along the helical configuration to a point below where the air and debris enter the hood from the bagging passage and applies a dislodging force on the air permeable bag to dislodge debris collected at an inner face of the air permeable bag.

2. The debris-collecting apparatus of claim 1, wherein the helical configuration of the hood extends at least two hundred and seventy degrees about an imaginary vertical axis.

3. The debris-collecting apparatus of claim 1, wherein the helical configuration of the hood extends at least three hundred and sixty degrees about an imaginary vertical axis.

4. The debris-collecting apparatus of claim 1, wherein:
   an opening is formed in the hood inside the helical configuration; and
   a filter is removably positioned to restrict the debris from exiting through the opening.

5. The debris-collecting apparatus of claim 4, wherein the filter extends downwardly inside at least one of the hood and the air permeable bag, whereby further causing helical movement of the debris by providing an inner boundary around which the debris must pass.

6. The debris-collecting apparatus of claim 5, wherein both external and internal surfaces of the hood have the helical configuration.

7. The debris-collecting apparatus of claim 6, further comprising a deflecting member covering the opening to direct airflow out of the opening, and wherein the helical configuration of the hood extends at least three hundred and sixty degrees about an imaginary vertical axis.

8. The debris-collecting apparatus of claim 1, wherein the ramp is located at a lower end of the helical configuration and extends fully about the lower end of the helical configuration; and further comprising structure extending downwardly inside the hood to further cause helical movement of the debris by providing an inner boundary around which the debris must pass.

9. The debris-collecting apparatus of claim 8, wherein the structure extending downwardly inside the hood includes a filter.

10. The debris-collecting apparatus of claim 1, wherein the draft inducer is a horizontal-axis draft inducer.

11. A hood for use with a mobile debris-collecting apparatus having an input portion, a draft inducer, and an air permeable bag; the hood comprising:
    an inlet for receiving air and debris drawn through the input portion by the draft inducer;
    a helical passage extending downwardly from the inlet at least two hundred and seventy degrees about an imaginary vertical axis to direct the air and debris from the inlet to the air permeable bag in a helical direction with sufficient airflow to dislodge debris collected at an inner face of the air permeable bag; and
    a ramp for directing the air and debris away from the hood and into the air permeable bag; the air permeable bag having a smaller diameter than the helical configuration; the ramp bridging the helical configuration and the air permeable bag.

12. The hood of claim 11, wherein the helical passage extends at least to a point directly below the inlet.

13. The hood of claim 12, wherein the helical passage extends downwardly from the inlet at least three hundred and sixty degrees about the imaginary vertical axis.

14. The hood of claim 13, wherein an opening is formed inside the helical passage, and the hood further comprises a filter removably positioned to restrict the debris from exiting through the opening.

15. The hood of claim 14, wherein the filter extends downwardly inside at least one of the helical passage and the air permeable bag, whereby further causing helical movement of the debris by providing an inner boundary around which the debris must pass.

16. The hood of claim 15, wherein an external surface of the hood is helically configured.

17. The hood of claim 16, further comprising a deflecting member covering the opening to direct airflow out of the opening.

18. The hood of claim 11, further comprising means for removably securing the air permeable bag below the helical passage.

19. The hood of claim 11, wherein an external surface of the hood is helically configured.

20. The hood of claim 11, wherein the ramp is located at a lower end of the helical configuration and extends fully about the lower end of the helical configuration; and further comprising structure extending downwardly inside the hood to further cause helical movement of the debris by providing an inner boundary around which the debris must pass.

* * * * *